(12) United States Patent
Remy

(10) Patent No.: US 6,487,245 B1
(45) Date of Patent: Nov. 26, 2002

(54) METHOD FOR TESTING A RADIOCOMMUNICATIONS NETWORK, CORRESPONDING DEVICE AND BASE STATION

(75) Inventor: M. Jean-Gabriel Remy, LePerreux (FR)

(73) Assignee: Societe Francaise du Radiotelephone, Paris la Defence (FR)

( * ) Notice: Subject to any disclaimer, the term of this patent is extended or adjusted under 35 U.S.C. 154(b) by 0 days.

(21) Appl. No.: 09/383,024

(22) Filed: Aug. 25, 1999

(30) Foreign Application Priority Data

Aug. 26, 1998 (FR) .............................. 98 10846

(51) Int. Cl.$^7$ .................. H04B 17/00; H04B 3/46; H04Q 1/20
(52) U.S. Cl. ...................... 375/224; 455/67.3
(58) Field of Search .............. 375/224, 227, 375/228, 259, 285, 316, 346, 347, 348, 349; 455/500, 501, 63, 67.1, 67.3, 550, 561, 132, 135, 286.1, 296, 303

(56) References Cited

U.S. PATENT DOCUMENTS 4,584,716 A * 4/1986 Drentea
5,325,403 A * 6/1994 Siwiak et al.
5,335,251 A * 8/1994 Onishi et al.
6,108,389 A * 8/2000 Morariu et al. ............. 375/355
6,173,014 B1 * 1/2001 Forssen et al. ............. 375/267
6,229,840 B1 * 5/2001 Ichihara ...................... 375/147
6,236,844 B1 * 5/2001 Cvetkovic et al.

FOREIGN PATENT DOCUMENTS

EP    0 647 978    4/1995

* cited by examiner

Primary Examiner—Jean Corrielus
(74) Attorney, Agent, or Firm—Kinney & Lange, P.A.

(57) ABSTRACT

A method and device for the testing of a radiocommunications network by implementing downline from a first antenna and a second antenna, respectively a first reception line and a second reception line. The first reception line is assigned to the reception of first signals, in a first incoming direction. A second reception line is assigned to the reception of second signals, in a second incoming direction. Each reception line tries to decode the signals that it receives and, if the decoding can be done, it reads an identifier proper to the transmitter, so as to determine firstly which of said first and second signals are interference signals, and, secondly, the incoming direction of interference signals and/or the identifier of interference units. The disclosure also relates to a corresponding base station.

7 Claims, 3 Drawing Sheets

METHOD FOR TESTING A RADIOCOMMUNICATIONS NETWORK, CORRESPONDING DEVICE AND BASE STATION

BACKGROUND OF THE INVENTION

The field of the invention is that of systems of radiocommunications with mobiles.

The invention can be applied especially but not exclusively to radiocommunications systems such as the UMTS (Universal Mobile Telecommunication System), GSM 900 (Global System for Mobiles—900 MHz), DCS 1800 (Digital Cellular System—1800 MHz) or PCS 1900 (Personal Communication System—1900 MHz) type systems.

More specifically, the present invention relates to a method for the testing of a radiocommunications network that consists in detecting and elucidating the nature of the interference between at least two transmitters, namely one the one hand a mobile station emitting useful signals towards a base station and, on the other hand, at least one interference unit sending interference signals also towards the base station.

It may be recalled that a radiocommunications system generally comprises a plurality of base stations, each carrying out the radio coverage of a distinct geographical cell.

Hereinafter in the present description, the term <<interference unit>> (with respect to a given mobile station) is understood to mean any type of device that is sending a base station, with which a given mobile station is communicating., signals having at least certain characteristics that are identical or similar to those of the signals coming from the given mobile station.

Depending on the system, the mobile station is sometimes called a radiocommunications terminal, a portable radiotelephone, a portable telephone or again a mobile radiocommunications terminal. With a view to simplification, only one expression, <<mobile station>> will be used hereinafter in this patent document.

It will be recalled that a mobile station is a piece of physical equipment used by a user of a network of the radiocommunications system to obtain access, through a base station, to the telecommunications services on offer.

It will also be recalled that a base station covers a given geographical zone (or cell) in which a plurality of mobile stations, with which the base station can exchange signals, may move about. Conventionally, a base station comprises at least one antenna designed to receive and/or transmit signals from and/or to a plurality of mobile stations.

The signals exchanged between a mobile station and the base station may be subject to interference that could generate a partial or even total loss of the information conveyed. It may be recalled that interference phenomena are caused especially when signals having identical or similar characteristics are brought into play in the same propagation medium. The expression <<identical or similar>> characteristics is understood to mean one and the same frequency, one and the same code or one and the same time interval depending on whether the type of multiplexing used is the Frequency Division Multiple Access (FDMA), Coded Division Multiple Access (CDMA) or Time Division Multiple Access (TDMA) type of multiplexing. In other words, the interference phenomena are due to the presence of at least one interference unit sending signals (called <<interference>> signals) which disturb the signals (called <<useful>> signals) sent by a mobile station. It will be understood therefore that such disturbances may generate crucial problems in terms of quality of reception and exploitation of the signals sent by a mobile station and intended for a base station.

Now, it is not possible, in the prior art, to detect the presence of an interference unit or units. It will be understood, however, that in order to reduce or even eliminate the interference due to one or more interference units, it is necessary to know about their existence and, if necessary, their nature, in order to take appropriate measures in order to try and eliminate them.

The present invention is designed especially to overcome this drawback of the prior art.

More specifically, one of the goals of the present invention is to provide a method for the testing of a radiocommunications network enabling the detection of the presence of at least one interference unit.

It is an additional goal of the invention to provide a method of this kind making it possible to determine the possible nature of the interference unit or units.

Another goal of the invention is to provide a method of this kind that can be implemented without any modification of the signals exchanged between a mobile station and a base station.

Another goal of the invention is to provide a method of this kind that can be implemented without any hardware modification of the existing mobile stations or, as the case may be, of the base stations.

Another goal of the invention is to provide a device enabling the implementing of a method such as this for the testing of a radiocommunications network.

SUMMARY OF THE INVENTION

These different goals as well as others that shall appear hereinafter are achieved according to the invention by means of a method for the testing of a radiocommunications network consisting in detecting and elucidating the nature of the interference between at least two transmitters, namely on the one hand a mobile station sending useful signals towards a base station and, on the other hand, at least one interference unit sending interference signals also towards said base station, the method comprising the following steps:

downline from a first antenna, a first reception line is implemented and, downline from at least one second antenna, at least one second reception line is implemented distinct from said first reception line, each antenna comprising an array of radiating elements distributed in a matrix arrangement on a support;

said first reception line is assigned to the reception of first signals, in a first incoming direction;

said at least one second reception line is assigned to the reception of second signals, in at least one second incoming direction;

each reception line tries to decode the signals that it receives and, if the decoding can be done, it reads an identifier that is conveyed by the signals and is proper to the transmitter that has sent them, so as to determine firstly which of said first and second signals are said interference signals and, secondly, at least one of the pieces of information belonging to the group comprising:

the incoming direction of said interference signals
the identifier, if any, of said at least one interference unit sending said interference signals.

The general principle of the invention relies therefore on the simultaneous focusing of several RF reception radiating beams (one per antenna) respectively on different sources of signals (namely, a source of useful signals and one or more sources, if any, of interference signals. Thus, at least one reception line is allocated to the processing of possible interference signals.

In this way, it is possible not only to know if one or more interference units are present but also to locate their angular position and find out their nature as the case may be.

It must be noted that the terms <<first antenna>> and <<second antenna>> (known as a <<smart antenna>>) have been used to simplify the understanding of the invention. It is clear, however, that it is not obligatory that there should be as many antennas as there are reception lines. In other words, the first and second antennas may constitute a single antenna.

It is also possible to plan that at least certain radiating elements of one and the same support should be shared by several antennas.

Advantageously, said incoming direction is expressed as a function of at least one of the angles belonging to the group comprising:
  the azimuth;
  the elevation angle.

It is recalled that an antenna associated with a reception line forms an RF reception radiating beam that may be oriented in elevation angle (namely the angle formed between the line connecting the mobile station to the antenna and the horizontal plane containing the support of the antenna) and/or the azimuth, (namely the angle formed between the line referenced in the horizontal plane containing the support of the antenna and the projection, in a direction perpendicular to this horizontal plane, of the line connecting the antenna to the mobile station).

Preferably, said at least one interference unit belongs to the group comprising:
  the mobile stations of said radiocommunications network
  the base stations of said radiocommunications network
  the transmitters not belonging to said radiocommunications network It will be noted that the nature of the interference unit or units may be unspecified, and may especially correspond to that of one or more interference units that are unrelated to any radiocommunications network.

In a particular embodiment of the invention, said method furthermore comprises a step for the display of at least one of the pieces of information belonging to the group comprising:
  the identifier or absence of identifier of said at least one interference unit;
  the incoming direction of the interference signals.

It will be noted that when an interference unit proves to be a mobile station or a base station of the radiocommunications network, the method of the invention constitutes a technique for detecting the imperfections of the radiocommunications network concerned. Indeed, this reflects a poor management of the distribution of the resources such as a double allocation of one and the same resource. This is the case, for example, when there are two neighboring (or relatively close) base stations both using at least one communications parameter that is the same, for example a frequency, a code, a time interval, etc., each to communicate with a separate mobile station.

Preferably, said base station and said mobile station are included in a cellular radiocommunications system belonging to the group comprising:

UMTS type systems
  GSM 900 type systems
  DCS 1800 type systems
  PCS 1900 type systems It is clear however, that this list is not exhaustive.

The invention also relates to a device for the testing of a radiocommunications network designed to implement the method described here above. According to the invention, said device comprises:
  a first antenna and a second antenna each comprising an array of radiating elements distributed in a matrix arrangement on a support;
  downline from said first antenna, a first reception line comprising first reception means and, downline from said at least one second antenna, at least one second reception line distinct from said first reception line and comprising second reception means;
  means for assigning said first reception line to the reception of first signals, in a first incoming direction;
  means for assigning said at least one second reception line to the reception of second signals, in at least one second incoming direction;
  means for decoding the signals received by each of said reception lines;
  reading means placed downline from said decoding means so as to read an identifier conveyed by the signals and proper to the transmitter that has sent them;
  decision-making means making it possible, as a function of output signals from said decoding and reading means, to determine firstly which of said first and second signals are said interference signals and, secondly, at least one of the pieces of information belonging to the group comprising:
    the incoming direction of said interference signals
    the identifier, if any, of said at least one interference unit sending said interference signals.

It will be recalled however that, according to one alternative embodiment of the invention, it is possible to provide for a single antenna supplying the different reception lines of the signals (useful signals and one or more sources of interference signals). In this case, it will be understood that the first and second antennas constitute one and only one antenna.

The invention also relates to a base station that makes it possible to detect and elucidate the nature of the interference phenomena between at least two transmitters, namely, on the one hand, a mobile station sending useful signals to said base station and, on the other hand, at least one interference unit sending interference signals also to said base station. According to the invention, said base station comprises the above-described device for testing a radiocommunications network.

It will be noted that certain elements (such as the first antenna and the first reception line) of the testing device are elements already included in the base station to enable it to communicate with the mobile stations. In this case, there is a high degree of synergy and the cost of the testing device is thus limited solely to the elements not already included in the base station.

BRIEF DESCRIPTION OF THE DRAWINGS

Other features and advantages of the invention shall appear from the following description of a preferred embodiment of the invention, given as a non-restrictive illustration with reference to the appended drawings, of which.

MORE DETAILED DESCRIPTION

The invention therefore relates to a method and a device to detect and elucidate the nature of the interference between at least two transmitters, namely on the one hand a mobile station sending useful signals to a base station and, on the other hand, at least one interference unit sending interference signals also to said base station.

Figure 2:
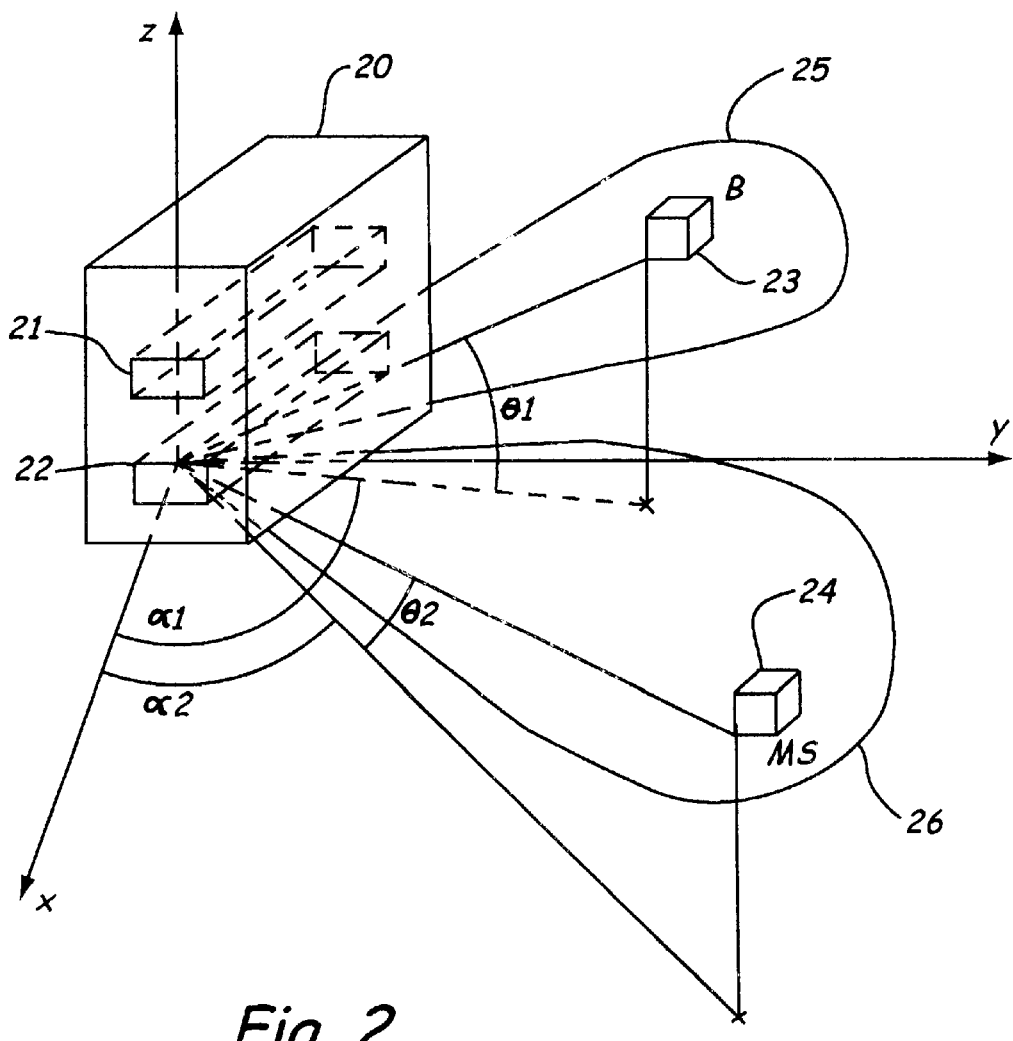
FIG. 2 provides a 3D view of the different elements that come into play in the implementation of the method of FIG. 1.

For the sake of simplification, and as shown in FIG. 2, it is assumed hereinafter in the invention that a single interference unit B sends interference signals that interfere with useful signals sent by a mobile station MS during a call with a base station BTS. It is clear, however, that the method of the invention may enable the simultaneous detection of a plurality of interference units, by implementing for example a plurality of reception lines (each one enabling the detection of an interference unit). These different signals (useful signal and interference signal) are received by means of distinct RF reception radiating beams.

Hereinafter in the description, and again for the sake of simplification, we shall consider two antennas each comprising an array of radiating elements distributed in matrix form on a support, each of the two antennas being connected to a signal (useful or interference signal) reception line.

It must be recalled, however, that according to one alternative embodiment of the invention, it is possible to have only one antenna connected to both the signal (useful and interference signal) reception lines. According to this alternative embodiment, in practice, the signal antenna is the hardware part and the reception lines are managed by software means.

Furthermore, it is also assumed that the cellular radiocommunications system to which the base station and the mobile station belong is of the UMTS type and implements an FDD-WCDMA mode of multiplexing at the frequency of 2 Ghz. The W-CDMA (Wideband Code Division Multiple Access) mode of the UMTS is defined in the decision of the ETSI dated January 1998 on the UMTS (Universal Mobile Telecommunications System), this decision being included herein as a reference. It may be recalled indeed that the broad outlines of the UMTS radio interface were decided upon in January 1998. The W-CDMA mode uses a CDMA access on a 5 MHz conduit. It is based on a multiplexing in communications codes with the mobile stations (Code Division Multiple Access) combined with a duplexing in transmission and reception frequencies (or FDD, for <<Frequency Division Duplex>>, such that two distinct frequency bands are used simultaneously, one in transmission and the other in reception).

However, the base station and the mobile station may also be included in systems, for example of the GSM 900 or DCS 1800 type or again of the PCS 1900 type.

Figure 1:
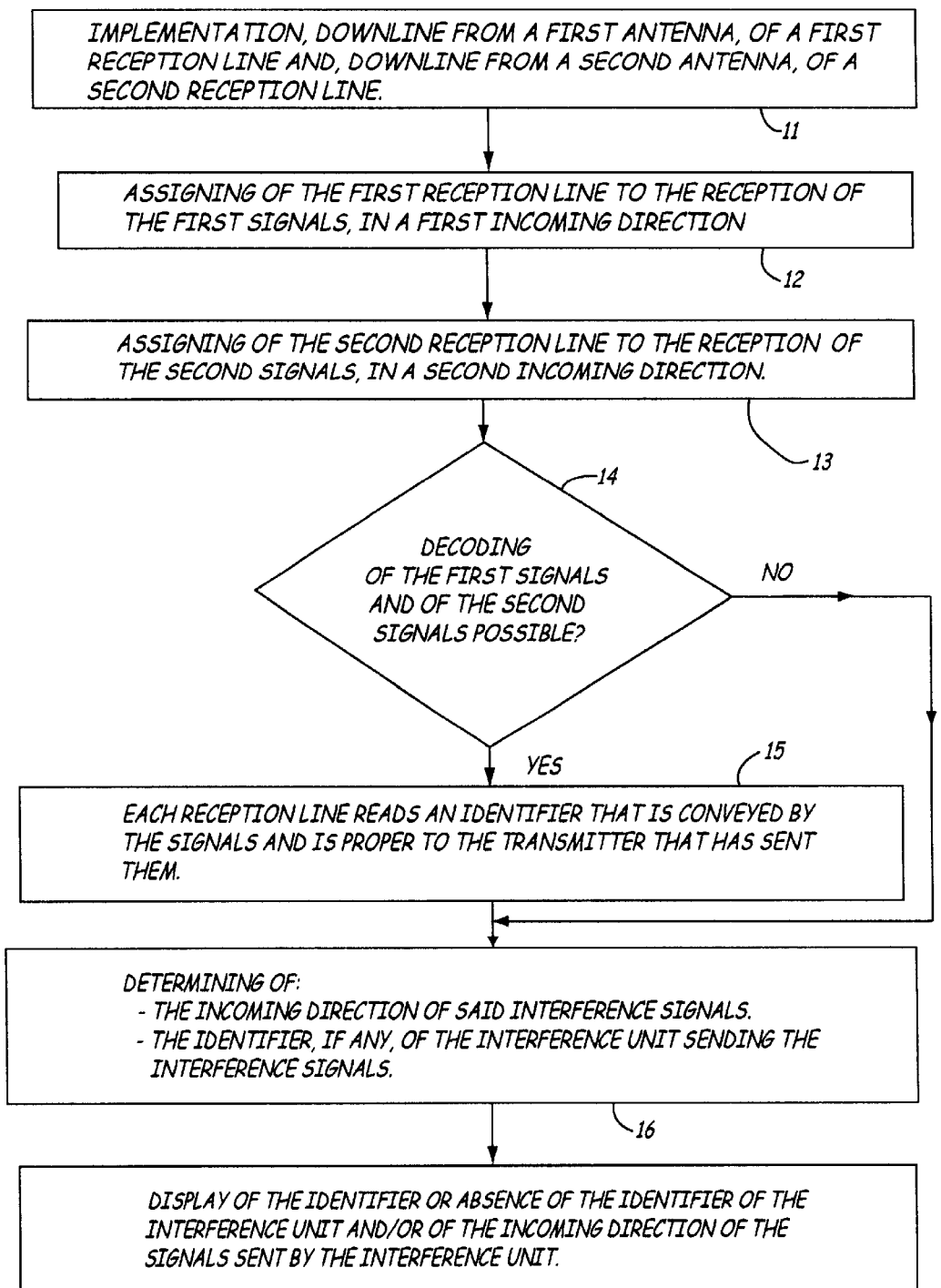
FIG. 1 is a simplified flow chart of a particular mode of implementation of a method according to the invention for testing a radiocommunications network.

With reference to the flow chart of FIG. 1, a description is now given of a particular mode of implementation of the method according to the invention for testing a radiocommunications network.

According to the invention, the method comprises the following steps:

- downline from a first antenna, a first reception line is implemented (11) and, downline from a second antenna, a second reception line distinct from the first reception line, is implemented, each antenna comprising an array of radiating elements distributed in a matrix arrangement on a support. Each reception line has its own associated RF reception radiating beam;
- the first reception line is assigned (12) to the reception of first signals, in a first incoming direction. These first signals come from a first transmitter located either in a geographical zone covered by the base station or in a nearby environment, for example in a neighboring cell or in the vicinity of the base station concerned;
- the second reception line is assigned (13) to the reception of second signals, in a second incoming direction. These second signals have at least certain characteristics identical or similar to those used by the first transmitter. The second signals come from a second transmitter also located either in the geographical zone covered by the base station or in a nearby environment such as a neighboring cell or in the vicinity of the base station concerned;
- each reception line tries(14) to decode the signals that it receives,
- if the decoding of each reception line can be done completely, then each reception line reads (15) an identifier conveyed by the signals and proper to the transmitter that has transmitted them, so as to determine (16) firstly which of the first and second signals are interference signals and, secondly, the incoming direction of the interference signals as well as the identifier of the interference unit sending the interference signals. This identifier is, for example, that of the interference unit within the cell in which the interference element is located. This identifier is conveyed by all the messages transmitted for example on the BCCH (Broadcast Control Channel) and BSIC (Base Station Identity Code) channels according to the GSM standard. In the former case, the interference unit belongs to the radiocommunications network;
- if the decoding of a reception line is not possible, then a direct deduction is made therefrom as to which of said first and second signals are the useful signals (these are the signals that it has been possible to decode) and which are the interference signals (these are the signals that it has not been possible to decode). In the latter case, the interference unit is therefore unrelated to the radiocommunications network, and only the incoming direction of the interference signals is determined (16).

In a particular embodiment, the method furthermore comprises a step (17) for the display of the identifier or of the absence of the identifier of the interference unit and/or of the incoming direction of the interference signals. An operator who uses the method of the invention thus views the nature of the interference unit and/or the precise origin of the interference signals.

For a given call, a method of this kind makes it possible not only to detect the presence of an interference unit in the cell associated with the concerned base station (or in an environment close to this cell) but also to provide the operator with information about the zone in which the interference unit is located. This zone encompasses especially the zone covered by the RF reception radiating beam associated with the corresponding reception line (namely either the first or the second reception line).

Depending on the nature of the interference unit or units and/or the angular position of the RF radiating beam for the reception of the interference signals, the operator may take every appropriate step enabling the elimination of the transmission of interference signals of this kind. The step or steps taken may consist especially of

- the assigning of one or more new parameters, distinct from those used by the calls in progress, in the concerned base station or possibly in one or more neighboring base stations. It will be noted that a method of this kind will make it possible to get a precise idea of the omissions and/or errors committed in the neighborhood of the concerned base station in WCDMA, which for example generate non-orthogonal codes and therefore interference phenomena);
- or inform a qualified authority in order to report the presence of an intruder in a specified incoming direction. The intruder is indeed in all likelihood not permitted to transmit with at least some of the characteristics that he uses in the zone in which he is located.

Following the steps taken as a function of especially of the nature of the interference unit, the quality of reception by the base station of the useful signals transmitted by the mobile station can then be improved.

A description shall now given, with reference to the partially 3D view of a simplified drawing of FIG. 2, of a base station of a radiocommunications network.

A base station 21 is located at a site 20 defining the center of a given cell that is assigned to it, in which it can receive and send signals. A radiocommunications network testing device 22 is placed on the same site 20 as that of the base station 21, for example at the starting point O of the 3D reference system (Ox, Oy, Oz). A device 22 such as this is designed to implement the method described here above, in order to detect and elucidate the nature of the interference between two transmitters, namely on the one hand a mobile station (MS) 24 sending useful signals to the base station 21 and, on the other hand, an interference unit (B) 23 sending interference signals also to the base station 21.

To do this, the device two has two directional smart antennas 310a, 310b as explained in detail further below (cf. FIG. 3).

It will be recalled that a directional smart antenna or an <<adaptive smart antennas>> comprises an array of radiating elements distributed in a matrix arrangement on a support (or panel). The array of radiating elements consists of a plurality of radiating elements, each of which is generally driven independently of the others, so as to form a beam according to a given azimuth.

By taking action, column by column, on the phase and power of each of the radiating elements, the radiocommunications network testing device 22 drives the antennas 310a, 310b in such a way that they generate two directional RF radiating beams 25, 26 oriented in azimuth, towards the mobile station 24 and the interference unit 23 if any. In other words, a first radiation pattern 26 of the antenna 310b is aimed at (or focused on) the mobile station in communication and a second radiation pattern 25 of the antenna 310a is aimed at the interference unit if any.

It must be noted that, in order to further improve the directivity and the gain of the smart antennas contained in the radiocommunications network testing device 22, it is possible to plan for the orienting of the RF radiating beams 25, 26 not only in azimuth but also in elevation angle. A technique such as this is described in the French patent application No. 98 0872 (unpublished) filed on behalf of the present Applicant. According to this technique, the orientation of the reception beam is done both in elevation angle and in azimuth, by acting on the reception parameters of each of the radiating elements, differently with respect to one another.

The RF reception beams 25, 26 can therefore be oriented in azimuth and $\alpha_1$ and $\alpha_2$ being the azimuth angles and $\theta_1$ and $\theta_2$ being the elevation angles. The pairs of angles ($\alpha_1$; $\theta_1$) and ($\alpha_2$; $\theta_2$) represent two distinct angles of arrival of the useful signals and the interference signals.

The interference unit 23 may be an element belonging to the radiocommunications network that contains the mobile station 24 and the base station 21. It may therefore be a mobile station or a neighboring base station. The interference unit 23 may also be an element unrelated to the radiocommunications network.

Reference shall now be made to exemplary standard interference situations depending on the type of multiplexing implemented by the radiocommunications system:

Frequency division multiple access (FDMA) multiplexing: an interference unit transmits on the frequency allocated to the mobile station, while communication is in progress:
- either the interference unit is of a known nature (it is a mobile station or a base station of the radiocommunications network): in this case, it sends, on its frequency, an identifier within the radiocommunications network;
- or the interference unit is not part of the radiocommunications network: in this case it does not send any identifier of the radiocommunications network;

Time division multiple access (TDMA) multiplexing: an interference unit transmits on the time interval allocated to the mobile station, while communication is in progress:
- either the interference unit belongs to the radiocommunications network: in this case, it sends an identifier within the radiocommunications network; during its time interval;
- or the interference unit is unrelated to the radiocommunications network: it does not send any identifier;

W-CDMA (Wideband Code Division Multiple Access) or CDMA (Code Division Multiple Access) multiplexing: the interference unit transmits in a frequency band allocated to the mobile station while communication is in progress or at a parasite frequency (namely a frequency that is a multiple of the frequency allocated to the mobile station):
- either the interference unit belongs to the radiocommunications network: in this case, on a code non-orthogonal to the code used by the mobile station, it sends an identifier within the radiocommunications network;
- or the interference unit is unrelated to the radiocommunications network: it does not make transmission with a code and therefore transmits without any identifier within the radiocommunications network.

Figure 3:
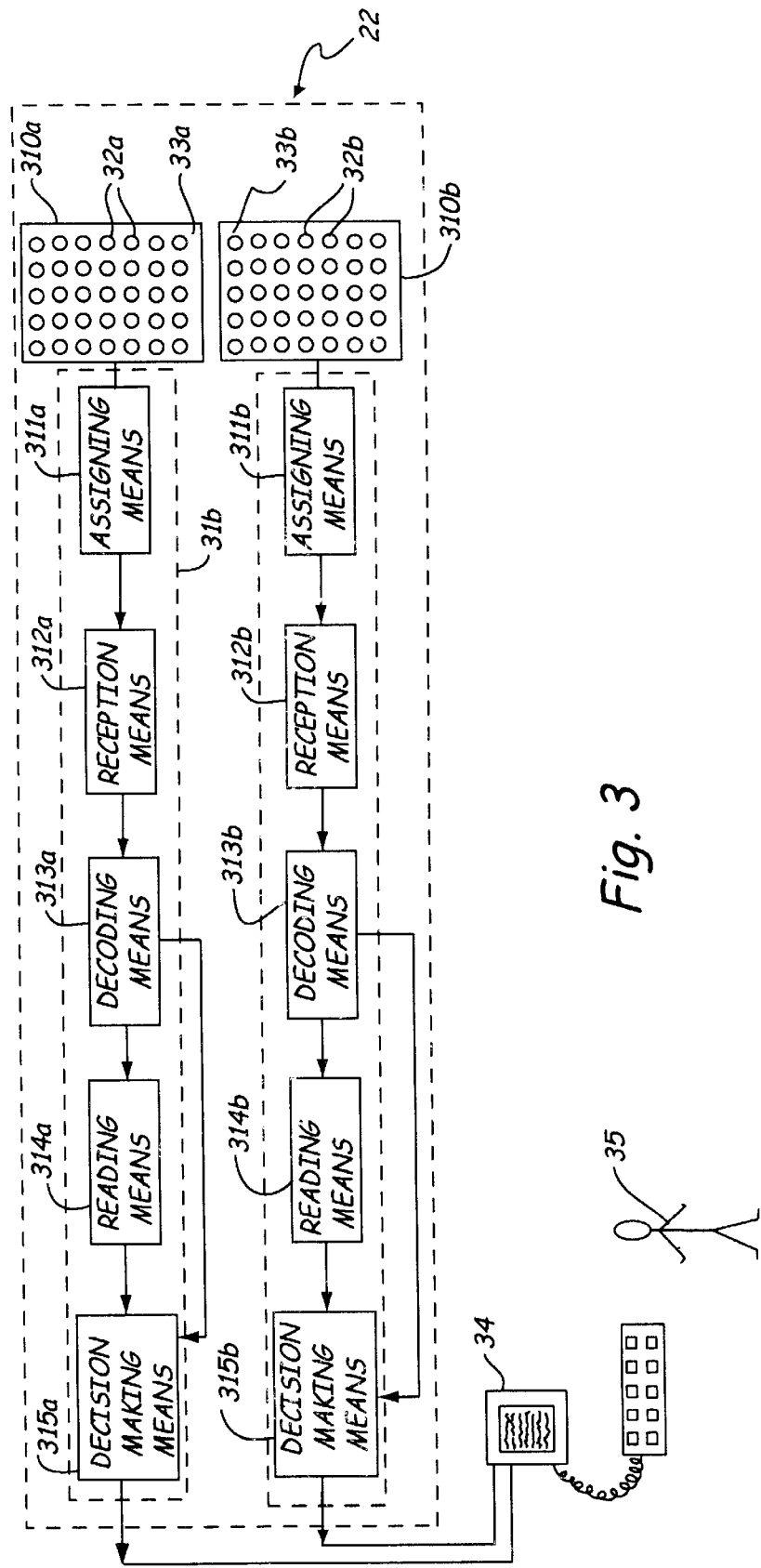
FIG. 3 is a detailed simplified diagram of a particular embodiment of the testing device according to the invention appearing in FIG. 2.

As is shown in the simplified drawing of FIG. 3, in a particular embodiment, the device 22 according to the invention for the testing of a radiocommunications network comprises:

- a first antenna and a second antenna 310a, 310b, each comprising an array of radiating elements 32a, 32b distributed in a matrix arrangement on a support 33a, 33b. The antennas 310a, 310b enable the real-time tracking of the mobile station and an interference unit 23 if any, when these elements are moving within the geographical zone covered by the two antennas 310a and 310b;

downline from a first antenna 310a, first reception line 31a comprising first reception means 312a, and downline from the second antenna 310b, a second reception line 31b distinct from the first reception line 31a, and comprising second reception means 312b. These first and second reception means 312a and 312b are known per se and carry out the radio processing of the signals received by their respective antennas (conventionally, the summation of the different contributions, amplification, filtering, baseband transfer, analog/digital conversion, maximizing of the reception of the signal by the obtaining of a maximum reception power level and/or a minimum binary error rate etc.).

means 311a for assigning the first reception line 31a to the reception of first signals, in a first incoming direction ($\alpha_1$; $\theta_1$) with $\alpha_1$ as the angle of azimuth and $\theta_1$ as the elevation angle. The first incoming direction can be determined on the basis of the relative phase shifts observed between the different radiating elements;

means 311b for the assigning of the second reception line 31b to the reception of second signals, in a second incoming direction ($\alpha_2$; $\theta_2$) with $\alpha_2$ as the angle of azimuth and $\theta_2$ as the elevation angle. The second incoming direction can also be determined on the basis of the relative phase shifts observed between the different radiating elements;

means 313a, 313b for the decoding of the signals received by each of the reception lines 31a, 31b. These means 313a, 313b enable the decoding of the first and second signals, so as to recover the messages transmitted by these signals;

reading means 314a, 314b, placed downline from the decoding means 313a, 313b, so as to read an identifier conveyed by the signals and proper to the transmitter that has transmitted them. It is this identifier that provides information on the nature of the transmitters (the mobile station 24 when communication is in progress and the interference unit 23);

decision-making means 315a, 315b making it possible, as a function of output signals from the decoding means 313a, 313b and reading means 314a, 314b, to determine, firstly, which of the first and second signals are the interference signals and, secondly, the incoming direction of the interference signals and/or the possible identifier of the interference unit 23 sending the interference signals.

The device 22 furthermore comprises means 34 to display the identifier or absence of identifier of the interference unit 23 and/or the incoming direction of the interference signals. An operator 35 may consult the results of the search for the interference units for a given communication between the mobile station 24 and the base station 21 which uses the device 21 described here above.

Should the interference unit belong to the radiocommunications network, the operator 35, as soon as he is informed about it (for example by a display), may modify the corresponding communications parameter or parameters to eliminate the interference phenomena. In particular, this may entail action at a neighboring base station having an anomaly or a defective mobile station, some of whose characteristics (especially those affecting the signals exchanged) have to be modified.

Should the interference unit not belong to the radiocommunications network, the available information about the interference unit (namely its angular position with respect to the base station) may be communicated to the qualified authorities (resource allocation committees, police etc.) so that they find the owner of the interference unit and stop the trouble that he or she is causing.

According to one alternative embodiment, the radiocommunications network testing device described here above is contained in the base station 21 of the radiocommunications network, and reutilizes a part of the constituent means of this network.

Indeed, if it is assumed that the base station is of the type implementing an SDMA (Spatial Division Multiple Access) type multiplexing, then it uses especially a directional and slewing RF reception radiating beam by the use of electronic means, so as to <<track>> the mobile station when it moves within the cell, to communicate with it. The base station therefore comprises at least one first directional smart antenna 310a and one reception line 31a as described here above, to communicate with the mobile station which is in the process of making communication. Thus, it is enough to add a second directional smart antenna and a second entire reception line to the base station, unless certain means (especially decoding and/or read means) of this second sequence can be shared with the test device of a radiocommunications network.

If, on the contrary, it is assumed that the base station is not of the type implementing a spatial division multiple access type (SDMA) of multiplexing, and implements for example a frequency division multiple access (FDMA) or time division multiple access or again a code division multiple access (CDMA) type of multiplexing, then it is necessary, in order to build the test device according to the invention, to provide for at least two additional smart antennas as well as at least one part of the different reception lines (especially means for the allocation of the different reception lines, decoding means and decision-making means).

What is claimed is:

1. A method for the testing of a radiocommunications network consisting in detecting and elucidating the nature of the interference between at least two transmitters, namely a mobile station sending useful signals towards a base station and at least one interference unit sending interference signals also towards said base station, wherein the method comprises the following steps:

downline from first antenna, implementing a first reception line and, downline from at least one second antenna, implementing at least one second reception line, distinct from said first reception line, each antenna comprising an array of radiating elements distributed in a matrix arrangement on a support;

assigning said first reception line to the reception of first signals, in a first incoming direction;

assigning said at least one second reception line to the reception of second signals, in at least one second incoming direction;

said first reception line trying to decode said first signals and said second reception line trying to decode said second signals and, if the decoding can be done, reads an identifier conveyed by the signals and distinctive to the transmitter that has sent the signals, so as to determine firstly which of said first and second signals are said interference signals and, so as to determine secondly, either the incoming direction of said interference signals or the identifier, if any, of said at least one interference unit sending said interference signals.

2. A method according to claim 1, wherein said incoming direction is expressed as a function of at least one of the angles belonging to the group comprising:

the azimuth;

the elevation angle.

3. A method according to claim 1, wherein said at least one interference unit belongs to the group comprising:
- a mobile station of said radiocommunications network, different from said mobile station which sends useful signals;
- a base station of said radiocommunications network, different from said base station which receives said useful signals; and the transmitters not belonging to said radiocommunications network.

4. A method according to claim 1, furthermore comprising the step for displaying: the identifier or absence of identifier of said at least one interference unit; or the incoming direction of the interference signals.

5. A method according to claim 1, wherein said base station and said mobile station are included in a cellular radiocommunications system belonging to the group comprising:
- UMTS type systems;
- GSM 900 type systems;
- DCS 1800 type systems; and
- PCS 1900 type systems.

6. A device for the testing of a radiocommunications network enabling the detection and elucidation of the nature of the interference between at least two transmitters, namely a mobile station sending useful signals towards a base station and at least one interference unit sending interference signals also towards the base station, wherein said device comprises:

- a first antenna and a second antenna each comprising an array of radiating elements distributed in a matrix arrangement on a support;
- downline from said first antenna, a first reception line comprising first reception means and, downline from said at least one second antenna, at least one second reception line distinct from said first reception line comprising second reception means;
- means for assigning said first reception line to the reception of first signals, in a first incoming direction;
- means for assigning said second reception line to the reception of second signals, in a second incoming direction;
- means for decoding the first signal received by the first reception line and the second signal received by the second reception line;
- reading means placed downline from said decoding means so as to read an identifier conveyed by the signals and distinctive to the transmitter that has sent said signals;
- decision-making means enabling, as a function of output signals from said decoding and reading means, to determine firstly which of said first and second signals are said interference signals and, secondly, the incoming direction of said interference signals or
- the identifier, if any, of said at least one interference unit sending said interference signals.

7. A base station comprising a testing device according to claim 6.

* * * * *